(12) United States Patent
Hatanaka et al.

(10) Patent No.: US 10,000,701 B2
(45) Date of Patent: Jun. 19, 2018

(54) CURED-FILM FORMATION COMPOSITION, ORIENTATION MATERIAL, AND RETARDATION MATERIAL

(71) Applicant: NISSAN CHEMICAL INDUSTRIES, LTD., Tokyo (JP)

(72) Inventors: Tadashi Hatanaka, Funabashi (JP); Tomohisa Ishida, Funabashi (JP); Shojiro Yukawa, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 0 days. days.

(21) Appl. No.: 14/409,008

(22) PCT Filed: Jun. 20, 2013

(86) PCT No.: PCT/JP2013/066962
§ 371 (c)(1),
(2) Date: Dec. 18, 2014

(87) PCT Pub. No.: WO2013/191251
PCT Pub. Date: Dec. 27, 2013

(65) Prior Publication Data
US 2015/0275091 A1  Oct. 1, 2015

(30) Foreign Application Priority Data

Jun. 20, 2012  (JP) ................................ 2012-138959

(51) Int. Cl.
| | | |
|---|---|---|
| *C09K 19/56* | (2006.01) | |
| *C08L 33/04* | (2006.01) | |
| *G02B 5/30* | (2006.01) | |
| *C08L 33/06* | (2006.01) | |
| *C08L 33/10* | (2006.01) | |
| *C08L 33/14* | (2006.01) | |
| *C08L 67/00* | (2006.01) | |
| *C08L 67/02* | (2006.01) | |

(52) U.S. Cl.
CPC .............. *C09K 19/56* (2013.01); *C08L 33/04* (2013.01); *C08L 33/066* (2013.01); *C08L 33/10* (2013.01); *C08L 33/14* (2013.01); *C08L 67/00* (2013.01); *C08L 67/02* (2013.01); *G02B 5/30* (2013.01)

(58) Field of Classification Search
CPC ......... C08K 19/56; C08L 33/10; C08L 33/14; C08L 67/00; C08L 67/02
See application file for complete search history.

(56) References Cited

U.S. PATENT DOCUMENTS

| | | | |
|---|---|---|---|
| 6,340,506 B1 | 1/2002 | Buchecker et al. | |
| 2012/0114879 A1* | 5/2012 | Hatanaka ................ | C08L 33/08 428/1.2 |
| 2013/0029087 A1* | 1/2013 | Hatanaka ........... | C09D 133/062 428/98 |

FOREIGN PATENT DOCUMENTS

| | | | |
|---|---|---|---|
| JP | H10-232365 A | | 9/1998 |
| JP | 2001-517719 A | | 10/2001 |
| JP | 3611342 B2 | | 1/2005 |
| JP | 2005-049865 A | | 2/2005 |
| JP | 2007-121721 | * | 5/2007 |
| JP | 2009-058584 A | | 3/2009 |
| WO | WO2011126022 A1 | * | 10/2011 |
| WO | 2012/018121 A1 | | 2/2012 |

OTHER PUBLICATIONS

Perstorp, Capa® For spearhead performance, 2011, p. 1-12.*
Labet, M., et al.; Chemical Society Reviews, 2009, p. 3484-3504.*
Sep. 10, 2013 International Search Report issued in International Application No. PCT/JP2013/066962.
Sep. 10, 2013 Written Opinion issued in International Application No. PCT/JP2013/066962.

* cited by examiner

*Primary Examiner* — Robert Jones, Jr.
(74) *Attorney, Agent, or Firm* — Oliff PLC

(57) ABSTRACT

There is provided a cured-film formation composition for providing an orientation material that has high photoreaction efficiency and excellent solvent resistance with adhesion durability, and that enables a polymerizable liquid crystal to be aligned even on a resin film in a highly sensitive manner. A cured-film formation composition including: (A) an acrylic polymer having a photo-aligning group; (B) a polymer having any one of a hydroxy group, a carboxy group, and an amino group on at least two terminals of a group bonded to a main chain; and (C) a cross-linking agent. An orientation material and a retardation material are obtained with the cured-film formation composition.

18 Claims, No Drawings

CURED-FILM FORMATION COMPOSITION, ORIENTATION MATERIAL, AND RETARDATION MATERIAL

TECHNICAL FIELD

The present invention relates to a cured-film formation composition, an orientation material, and a retardation material.

BACKGROUND ART

Recently, in the field of displays such as televisions including liquid crystal panels, as an approach to achieve higher performance, 3D displays with which 3D images can be enjoyed have been developed. In such 3D displays, a stereoscopic image can be displayed by, for example, making the right eye of a viewer see an image for the right eye and making the left eye of the viewer see an image for the left eye.

Various 3D display methods for displaying 3D images can be used, and examples of the methods known as methods requiring no special eyeglasses include a lenticular lens method and a parallax barrier method.

As one of display methods for viewers to see 3D images with eyeglasses, a circularly polarized glasses method, for example, is known (see Patent Document 1, for example).

In a 3D display using the circularly polarized glasses method, a retardation material having a pattern is generally arranged on a display element for forming an image of a liquid crystal panel and the like. The retardation material having a pattern is constituted in which two types of retardation regions having different retardation characteristics are regularly arranged each in plurality. In the present specification, a retardation material thus patterned in which a plurality of retardation regions having different retardation characteristics is arranged is called a patterned retardation material hereinafter.

The patterned retardation material can be fabricated by optically patterning a retardation substance including a polymerizable liquid crystal as described in Patent Document 2, for example. In the optical patterning of the retardation substance including a polymerizable liquid crystal, a photo-alignment technique known for forming an orientation material for a liquid crystal panel is used. More specifically, a coating made of a material having photo-alignment properties is provided on a substrate, and two types of polarized beams having different polarization directions are irradiated on this coating. Thus, a photo-alignment film is obtained as an orientation material in which two types of liquid crystal alignment regions are formed and the directions of alignment control of liquid crystals in the regions are different. Onto this photo-alignment film, a retardation substance containing a polymerizable liquid crystal in a solution state is applied to perform alignment of the polymerizable liquid crystal. Subsequently, the polymerizable liquid crystal thus aligned is cured to form a patterned retardation material.

As materials having photo-alignment properties that can be used in orientation material formation using a photo-alignment technique for liquid crystal panels, an acrylic resin and a polyimide resin, for example, are known that have in a side chain thereof a photodimerized moiety such as a cinnamoyl group and a chalcone group, for example. It is described that these resins exhibit a property of controlling alignment of liquid crystals (hereinafter, also called liquid crystal alignment properties) by polarized UV irradiation (see Patent Document 3 to Patent Document 5).

PRIOR ART DOCUMENTS

Patent Documents

Patent Document 1: Japanese Patent Application Publication No. 10-232365 (JP 10-232365 A)
Patent Document 2: Japanese Patent Application Publication No. 2005-49865 (JP 2005-49865 A)
Patent Document 3: Japanese Patent No. 3611342 (JP 3611342 B2)
Patent Document 4: Japanese Patent Application Publication No. 2009-058584 (JP 2009-058584 A)
Patent Document 5: Published Japanese Translation of PCT Application No. 2001-517719 (JP 2001-517719 T)

SUMMARY OF THE INVENTION

Problem to be Solved by the Invention

However, the study of the inventors of the present invention indicates that acrylic resins having in a side chain thereof a photodimerized moiety such as a cinnamoyl group and a chalcone group do not provide a sufficient property (alignment sensitivity) when the acrylic resins are used for formation of a retardation material. In particular, to irradiate these resins with polarized UV light to form an orientation material and optically pattern a retardation substance including a polymerizable liquid crystal using the orientation material, a large exposure amount of polarized UV light is necessary. This makes the exposure amount of the polarized UV light much larger than the exposure amount (e.g., about 100 $mJ/cm^2$) of polarized UV light sufficient to align a liquid crystal for a general liquid crystal panel.

One of the reasons for the increase in the exposure amount of the polarized UV light is that, in the formation of a retardation material, unlike in a liquid crystal for a liquid crystal panel, a polymerizable liquid crystal in a state of solution is applied onto an orientation material.

More specifically, when acrylic resins and the like having in a side chain thereof a photodimerized moiety such as a cinnamoyl group are used to form an orientation material, and a polymerizable liquid crystal is aligned with the orientation material, photocrosslinking due to photodimerization reaction occurs in the acrylic resins and the like. In this process, irradiation with polarized light in a large exposure amount is necessary until the resistance of the orientation material to a polarizable liquid crystal solution appears.

By contrast, in general, aligning a liquid crystal for a liquid crystal panel requires dimerization reaction only on the surface of an orientation material with photo-alignment properties.

When a conventional material such as the acrylic resin is used to provide an orientation material with solution resistance to a polymerizable liquid crystal solution, the reaction is required to advance into the orientation material, therefore, a larger amount of exposure is demanded. Consequently, the alignment sensitivity of a conventional material is significantly reduced disadvantageously.

A technique is known in which a cross-linking agent is added to the resin of the conventional material in order to have such solution resistance. However, it is known that a three-dimensional structure is formed inside a coating that is formed after heat-curing reaction with a cross-linking agent is performed, whereby the photoreactivity is reduced. In other words, even if a conventional material with the cross-linking agent added is used, the alignment sensitivity is significantly reduced and a desired effect cannot be obtained.

In view of the foregoing, a photo-alignment technique that can improve the alignment sensitivity of an orientation material to reduce the exposure amount of polarized UV light and a cured-film formation composition that is used for forming the orientation material are desired. A technique is also desired that can efficiently provide a patterned retardation material.

In production of a patterned retardation material for a 3D display using the photo-alignment technique, formation thereof has been conventionally performed on a glass substrate. However, in recent years, to meet the demand for production cost reduction, it is desired that the patterned retardation material be produced on an inexpensive resin film such as a triacetylcellulose (TAC) film or a cycloolefin polymer (COP) by what is called roll-to-roll.

However, with a photo-alignment film formed of a conventional material as described above, the adhesion to a resin film is low, and it is difficult to produce a patterned retardation material that is highly reliable on the resin film.

Thus, an orientation material is desired that has high adhesion to a resin film, can form a highly reliable retardation material even on a resin film such as a TAC film, and can be used in the photo-alignment technique, and also a cured-film formation composition for forming the orientation material is desired. Such retardation films formed on bases are desired that have adhesion and retardation characteristics not deteriorating under high temperature and humidity conditions.

The present invention has been made based on the above-described findings and study results. An object of the present invention is to provide a cured-film formation composition for providing an orientation material that has high photoreaction efficiency and excellent solvent resistance with adhesion durability, and with which a polymerizable liquid crystal can be aligned even on a resin film in a highly sensitive manner.

Another object of the present invention is to provide an orientation material that is obtained from the cured-film formation composition and has high photoreaction efficiency and excellent solvent resistance with adhesion durability, and that enables a polymerizable liquid crystal to be aligned even on a resin film in a highly sensitive manner, and to provide a retardation material that is formed with the orientation material.

The other objects and advantages of the present invention will be apparent from the following description.

Means for Solving the Problem

A first aspect of the present invention relates to a cured-film formation composition characterized by comprising:
(A) an acrylic polymer having a photo-aligning group;
(B) a polymer having any one of a hydroxy group, a carboxy group, and an amino group on at least two terminals of a group bonded to a main chain; and
(C) a cross-linking agent.

In the first aspect of the present invention, the photo-aligning group of the component (A) is preferably a functional group having a structure to be photodimerized or photoisomerized.

In the first aspect of the present invention, the photo-aligning group of the component (A) is preferably a cinnamoyl group.

In the first aspect of the present invention, the photo-aligning group of the component (A) is preferably a group having an azobenzene structure.

In the first aspect of the present invention, the component (A) is preferably an acrylic polymer further having at least one substituent selected from the group consisting of a hydroxy group, a carboxy group, and an amino group.

In the first aspect of the present invention, the component (B) is preferably at least one polymer selected from the group consisting of a polyether polyol, a polyester polyol, a polycarbonate polyol, and a polycaprolactone polyol.

In the first aspect of the present invention, the cross-linking agent of the component (C) is preferably more hydrophilic than the component (A).

In the first aspect of the present invention, the cross-linking agent of the component (C) is preferably a cross-linking agent having a methylol group or an alkoxymethyl group.

In the first aspect of the present invention, the cured-film formation composition preferably further comprises a cross-linking catalyst (D).

In the first aspect of the present invention, a ratio of the component (A) to the component (B) is preferably 5:95 to 95:5 in a mass ratio.

In the first aspect of the present invention, 10 parts by mass to 100 parts by mass of the component (C) is preferably contained based on 100 parts by mass of the total amount of the component (A) and the component (B).

In the first aspect of the present invention, 0.01 part by mass to 20 parts by mass of the component (D) is preferably contained based on 100 parts by mass of the total amount of the component (A) and the component (B).

A second aspect of the present invention relates to an orientation material characterized by being obtained with the cured-film formation composition of the first aspect of the present invention.

A third aspect of the present invention relates to a retardation material characterized by being formed with a cured film that is obtained from the cured-film formation composition of the first aspect of the present invention, Effects of the Invention According to the first aspect of the present invention, it is possible to provide a cured-film formation composition for providing an orientation material that has excellent adhesion, alignment sensitivity, pattern formability, and adhesion durability, and with which a polymerizable liquid crystal can be aligned even on a resin film in a highly sensitive manner, According to the second aspect of the present invention, it is possible to provide an orientation material that has excellent adhesion, alignment sensitivity, pattern formability, and adhesion durability, and with which a polymerizable liquid crystal can be aligned in a highly sensitive manner.

According to the third aspect of the present invention, it is possible to provide a retardation material that can efficiently be formed and optically patterned even on a resin film,

MODES FOR CARRYING OUT THE INVENTION

<Cured-Film Formation Composition>

The cured-film formation composition of the present embodiment contains an acrylic polymer having a photo-aligning group being the component (A), a polymer having any one of a hydroxy group, a carboxy group, and an amino group on at least two terminals of a group bonded to a main chain, being the component (B), and a cross-linking agent being the component (C). The cured-film formation composition of the present embodiment can further contain a cross-linking catalyst as a component (D) in addition to the component (A), the component (B), and the component (C). Unless the effects of the present invention are impaired, the cured-film formation composition may contain other additives.

Details of each component will be described below,
<Component (A)>

The component (A) contained in the cured-film formation composition of the present embodiment is an acrylic polymer having a photo-aligning group. The component (A) is a polymer, that is, a high molecular compound, whereby an orientation material obtained in the present invention has improved adhesion durability to a substrate. In the case where an alignment component is a low molecular compound having a photoreactive group, an unreacted alignment component may cause exfoliation to reduce adhesion under high temperature and humidity conditions. However, a high molecular alignment component hardly causes exfoliation, thus the adhesion does not deteriorate. In the present invention, the term "polymer" includes a copolymer obtained by copolymerizing a plurality of types of monomers, in addition to a polymer obtained by polymerizing a single monomer, As the acrylic polymer in the present invention, a polymer obtained by polymerizing an acrylic ester or a methacrylic ester and a copolymer obtained by polymerizing such a monomer and a monomer having an unsaturated double bond such as styrene can be used.

The acrylic polymer having a photo-aligning group being the component (A) (hereinafter may be simply called a specific copolymer) may be an acrylic polymer having such a structure, and the skeleton of the main chain and the type of the side chain constituting the acrylic polymer are not limited to particular ones.

The acrylic polymer of the component (A) has a weight-average molecular weight of preferably 1,000 to 200,000, more preferably 2,000 to 150,000, and still more preferably 3,000 to 100,000. An excessively high weight-average molecular weight exceeding 200,000 may reduce the solubility in solvent, so that the handling property may deteriorate, and an excessively low weight-average molecular weight below 1,000 may cause insufficient curing during heat curing, so that the solvent resistance and the heat resistance may decrease. The weight-average molecular weight herein is a value obtained by gel permeation chromatography (GPC) using polystyrene as the standard sample.

As a method for synthesizing an acrylic polymer having a photo-aligning group being the component (A), a method for polymerizing a monomer having a photo-aligning group is simple.

In the present invention, an example of the photo-aligning group includes a functional group having a structural moiety to be photodimerized and a structure to be photoisomerized.

The structure to be photodimerized is a moiety that forms a dimer by irradiation with light, and specific examples thereof include a cinnamoyl group, a chalcone group, a coumarin group, and an anthracene group. Among them, a cinnamoyl group having high transparency in the visible light range and photodimerization reactivity is preferred.

In addition, the structure to be photoisomerized is a moiety that is converted into a cis form or a trans form by irradiation with light, and specific examples thereof include an azobenzene structure and a stilbene structure. Among them, in terms of high reactivity, the azobenzene structure is preferred.

Formulae [A1] to [A3] represent specific examples of such a monomer having a photo-aligning group. When an acrylic polymer having a photo-aligning group being the component (A) of the present invention is synthesized with the monomers of Formulae [A1] to [A3], monomers having an acryloyloxy group or a methacryloyloxy group are inevitably used out of the following monomers.

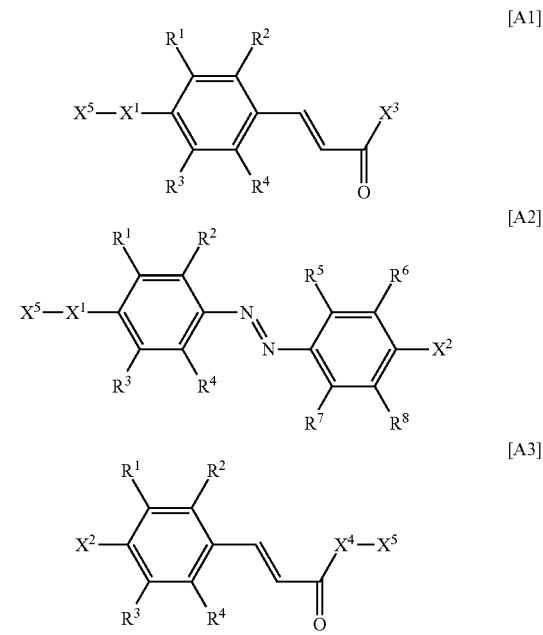

In Formulae [A1] to [A3], $X^1$ is a structure obtained by bonding to one to three divalent substituents selected from the group consisting of a $C_{1-18}$ alkylene group, a phenylene group, and a biphenylene group through one or more bonds selected from the group consisting of a single bond, an ether bond, an ester bond, an amide bond, an urethane bond, and an amino bond. In this case, the alkylene group may be a straight chain, a branched chain, or a ring; the alkylene group may be substituted with a hydroxy group; and the phenylene group and the biphenylene group may be substituted with a halogen atom or a cyano group.

$X^2$ is a hydrogen atom, a halogen atom, a cyano group, a $C_{1-18}$ alkyl group, a phenyl group, a biphenyl group, or a cyclohexyl group. In this case, the $C_{1-18}$ alkyl group, the phenyl group, the biphenyl group, or the cyclohexyl group may be bonded to a benzene ring through a single bond, an ether bond, an ester bond, an amide bond, or a urea bond.

$X^3$ is a hydroxy group, a phenyl group, a $C_{1-4}$ alkyl group, a $C_{1-4}$ alkoxy group, or a phenyl group substituted with a halogen atom, a trifluoromethyl group, a cyano group, or another group.

$X^4$ is a structure obtained by bonding to one to three divalent substituents selected from the group consisting of a $C_{1-18}$ alkylene group, a phenylene group, and a biphenylene group through one or more bonds selected from the group consisting of a single bond, an ether bond, an ester bond, an amide bond (a carbonyl group in Formula [A3] may be a part of the ester bond or the amide bond), an urethane bond and an amino bond. In this case, the alkylene group may be a straight chain, a branched chain, or a ring; the alkylene group may be substituted with a hydroxy group; and the phenylene group and the biphenylene group may be substituted with a halogen atom or a cyano group.

$X^5$ is a polymerizable group. Specific examples of the polymerizable group include an acryloyl group, a methacryloyl group, an acryloyloxy group, a methacryloyloxy group, a styrene group, a maleimide group, an acrylamide group, and a methacrylamide group.

In the Formulae, $R^1$, $R^2$, $R^3$, $R^4$, $R^5$, $R^6$, $R^7$, and $R^8$ are each independently a hydrogen atom, a $C_{1-4}$ alkyl group, a $C_{1-4}$ alkoxy group, a halogen atom, a trifluoromethyl group, or a cyano group.

The component (A) contained in the cured-film formation composition of the present embodiment is preferably an acrylic polymer further having at least one substituent selected from the group consisting of a hydroxy group, a carboxy group, and an amino group, in addition to the photo-aligning group.

A simple method for obtaining an acrylic polymer further having at least one substituent selected from the group consisting of a hydroxy group, a carboxy group, and an amino group, in addition to a photo-aligning group, is a method for copolymerizing the monomer having a photo-aligning group and at least one monomer selected from monomers having a hydroxy group, a carboxy group, and/or an amino group.

Examples of the monomer having a hydroxy group, a carboxy group, or an amino group include a monomer having a hydroxy group such as 2-hydroxyethyl acrylate, 2-hydroxyethyl methacrylate, 2-hydroxypropyl acrylate, 2-hydroxypropyl methacrylate, 4-hydroxybutyl acrylate, 4-hydroxybutyl methacrylate, 2,3-dihydroxypropyl acrylate, 2,3-dihydroxypropyl methacrylate, diethylene glycol monoacrylate, diethylene glycol monomethacrylate, caprolactone 2-(acryloyloxy)ethyl ester, caprolactone 2-(methacryloyloxy)ethyl ester, poly(ethylene glycol)ethyl ether acrylate, poly(ethylene glycol)ethyl ether methacrylate, 5-acryloyloxy-6-hydroxy-norbornene-2-carboxylic-6-lactone, and 5-methacryloyloxy-6-hydroxy-norbornene-2-carboxylic-6-lactone; a monomer having a carboxy group such as acrylic acid, methacrylic acid, crotonic acid, mono-(2-(acryloyloxy)ethyl)phthalate, mono-(2-(methacryloyloxy)ethyl)phthalate, N-(carboxyphenyl)maleimide, N-(carboxyphenyl)methacrylamide, and N-(carboxyphenyl)acrylamide; a monomer having a phenolic hydroxy group such as hydroxystyrene, N-(hydroxyphenyl)methacrylamide, N-(hydroxyphenyl)acrylamide, and N-(hydroxyphenyl)maleimide; and a monomer having an amino group such as aminoethyl acrylate, aminoethyl methacrylate, aminopropyl acrylate, and aminopropyl methacrylate.

In the present invention, when a specific copolymer (an acrylic polymer having a photo-aligning group) is obtained, in addition to the monomer having a photo-aligning group and the monomer having at least one substituent selected from a hydroxy group, a carboxy group, and an amino group, another monomer that is copolymerizable with these monomers but has no above-mentioned specific functional group can be used together.

Specific examples of the other monomer include an acrylic ester compound, a methacrylic ester compound, a maleimide compound, an acrylamide compound, acrylonitrile, a maleic anhydride, a styrene compound, and a vinyl compound, each of which has no above-mentioned functional group (the photo-aligning group, hydroxy group, carboxy group, and amino group).

The specific examples of the monomer are described below, but the monomer is not limited to these.

Examples of the acrylic ester compound include methyl acrylate, ethyl acrylate, isopropyl acrylate, benzyl acrylate, naphthyl acrylate, phenyl acrylate, glycidyl acrylate, 2,2,2-trifluoroethyl acrylate, tert-butyl acrylate, cyclohexyl acrylate, isobornyl acrylate, 2-methoxyethyl acrylate, methoxytriethylene glycol acrylate, 2-ethoxyethyl acrylate, tetrahydrofurfuryl acrylate, 3-methoxybutyl acrylate, 2-methyl-2-adamantyl acrylate, 2-propyl-2-adamantyl acrylate, 8-methyl-8-tricyclodecyl acrylate, and 8-ethyl-8-tricyclodecyl acrylate, Examples of the methacrylic ester compound include methyl methacrylate, ethyl methacrylate, isopropyl methacrylate, benzyl methacrylate, naphthyl methacrylate, phenyl methacrylate, glycidyl methacrylate, 2,2,2-trifluoroethyl methacrylate, tert-butyl methacrylate, cyclohexyl methacrylate, isobornyl methacrylate, 2-methoxyethyl methacrylate, methoxytriethylene glycol methacrylate, 2-ethoxyethyl methacrylate, tetrahydrofurfuryl methacrylate, 3-methoxybutyl methacrylate, 2-methyl-2-adamantyl methacrylate, γ-butyrolactone methacrylate, 2-propyl-2-adamantyl methacrylate, 8-methyl-8-tricyclodecyl methacrylate, and 8-ethyl-8-tricyclodecyl methacrylate.

Examples of the vinyl compound include methyl vinyl ether, benzyl vinyl ether, vinylnaphthalene, vinylcarbazole, allyl glycidyl ether, 3-ethenyl-7-oxabicyclo[4.1.0]heptane, 1,2-epoxy-5-hexene, and 1,7-octadiene monoepoxide.

Examples of the styrene compound include styrene, methylstyrene, chlorostyrene, and bromostyrene.

Examples of the maleimide compound include maleimide, N-methylmaleimide, N-phenylmaleimide, and N-cyclohexylmaleimide.

As the amounts of the monomers used for obtaining the specific copolymer, it is preferable that the amount of a monomer having a photo-aligning group be 25 to 100% by mole, the amount of a monomer having a hydroxy group, a carboxy group, and/or an amino group be 0 to 75% by mole, and the amount of a monomer having no specific functional group be 0 to 75% by mole, based on the total amount of all of the monomers. In the case where the content of a monomer having a photo-aligning group is less than 25% by mole, it is difficult to provide excellent liquid crystal alignment properties with high sensitivity. The content of a monomer having at least one substituent selected from a hydroxy group, a carboxy group, and an amino group is preferably 10 to 75% by mole. If the content is less than 10% by mole, it is difficult to provide sufficient heat curing properties and maintain excellent liquid crystal alignment properties with high sensitivity.

Although the method for obtaining the specific copolymer used in the present invention is not limited to a particular method, the specific copolymer can be obtained, for example, by subjecting a monomer having a specific functional group, a monomer without a specific functional group if desired, and a polymerization initiator or the like to polymerization reaction in a solvent in which they coexist at a temperature of 50° C. to 110° C. The solvent used herein is not limited as long as the solvent can dissolve a monomer having a specific functional group, a monomer without a specific functional group used if desired, and a polymerization initiator or the like. Specific examples thereof will be described in <Solvent> described later.

The specific copolymer obtained by the method is generally in a state of being dissolved in the solvent and can be used as is (in a state of a solution) for preparing the cured-film formation composition of the present invention.

The solution of the specific copolymer obtained by the above-described method is poured into diethyl ether, water, or the like with stirring and the specific copolymer is reprecipitated, Thereafter, the precipitate thus obtained is filtered and washed, and then is dried at room temperature or dried by heating under atmospheric pressure or reduced pressure, whereby a powder of a specific copolymer can be obtained. By this operation, the polymerization initiator and unreacted monomer(s) that coexist with the specific copolymer can be removed, and consequently a powder of the purified specific copolymer can be obtained. If the specific copolymer cannot be sufficiently purified by one operation, the obtained powder may be redissolved in a solvent, followed by repeating the above-described operation.

In the present invention, the acrylic polymer having a photo-aligning group (specific copolymer) of the component (A) may be used in a form of powder or in a form of solution in which the purified powder is redissolved in a solvent described later.

In the present invention, the specific copolymer of the component (A) may be a mixture of a plurality types of specific copolymers.

<Component (B)>

The component (B) contained in the cured-film formation composition of the present embodiment is a polymer having any one of a hydroxy group, a carboxy group, and an amino group (hereinafter may also be called a specific substituent) on at least two terminals of a group bonded to a main chain. The component (B) is deemed to contribute to increase in adhesion because the presence of at least two specific substituents acting as reactive sites with a cross-linking agent provides a cross-linked film with low-density and flexibility. By contrast, excess number of the specific substituents increases the density of a cross-linked film and decreases the flexibility, thereby adversely affecting the adhesion. Consequently, polymers having one specific substituent per number average molecular weights ranging from 300 to 10,000, as well as specific substituents on at least two terminals of a group bonded to a main chain are preferred. In this case, it is preferable that the specific substituents in the same polymer be separated as far as possible, or at least repeating units having the specific substituents be not adjacent to each other.

Examples of the polymer being the component (B) include a polymer having a straight-chain structure or a branched structure in which a hydroxy group, a carboxy group, or an amino group is provided on a terminal of a polyether polyol, a polyester polyol, a polycarbonate polyol, a polycaprolactone polyol, a polyamine, or the like.

Examples of the polymer being the component (B) include a polyether polyol such as polyethylene glycol and polypropylene glycol, or a compound obtained by adding or condensing propylene oxide, polyethylene glycol, or polypropylene glycol, or the like, to a polyhydric alcohol such as propylene glycol, bisphenol A, triethylene glycol, and sorbitol. Specific examples of the polyether polyol include ADEKA polyether P-series, G-series, EDP-series, BPX-series, PC-series, and CM-series manufactured by ADEKA Corporation; and UNIOX (registered trademark) HC-40, HC-60, ST-30E, ST-40E, G-450, and G-750, UNIOL (registered trademark) TG-330, TG-1000, TG-3000, TG-4000, HS-1600D, DA-400, DA-700, and DB-400, and NONION (registered trademark) LT-221, ST-221, and OT-221 manufactured by NOF Corporation.

Examples of the polyester polyol being one preferred example of the polymer of the component (B) include those obtained by causing a polyvalent carboxylic acid such as adipic acid, sebacic acid, and isophthalic acid to react with a diol such as ethylene glycol, diethylene glycol, propylene glycol, butylene glycol, polyethylene glycol, and polypropylene glycol. Specific examples of the polyester polyol include POLYLITE (registered trademark) OD-X-286, OD-X-102, OD-X-355, OD-X-2330, OD-X-240, OD-X-668, 8651, OD-X-2108, OD-X-2376, OD-X-2044, OD-X-688, OD-X-2068, OD-X-2547, OD-X-2420, OD-X-2523, OD-X-2555, and OD-X-2560 manufactured by DIC Corporation; and Polyol P-510, P-1010, P-2010, P-3010, P-4010, P-5010, P-6010, F-510, F-1010, F-2010, F-3010, P-1011, P-2011, P-2013, P-2030, N-2010, PNNA-2016, C-590, C-1050, C-2050, C-2090, and C-3090 manufactured by Kuraray Co., Ltd.

Examples of the polycaprolactone polyol being one preferred example of the polymer of the component (B) include those obtained by causing a polyhydric alcohol such as trimethylolpropane and ethylene glycol to react with polycaprolactone. Specific examples of the polycaprolactone polyol include POLYLITE (registered trademark) OD-X-2155, OD-X-640, and OD-X-2568 manufactured by DIC Corporation; and PLACCEL (registered trademark) 205, L205AL, 205U, 208, 210, 212, L212AL, 220, 230, 240, 303, 305, 308, 312, and 320 manufactured by Daicel Corporation.

Examples of the polycarbonate polyol being one preferred example of the polymer of the component (B) include those obtained by causing a polyhydric alcohol such as trimethylolpropane and ethylene glycol to react with a polycarbonate. Specific examples of the polycarbonate polyol include PLACCEL (registered trademark) CD205, CD205PL, CD210, and CD220 manufactured by Daicel Corporation.

Examples of the polyamine being one preferred example of the polymer of the component (B) include polyethylene imine obtained by polymerizing ethyleneimine and polyamidoamine dendrimer obtained by repeating the reaction of diamine and methyl acrylate. Specific examples of the polyamine include LUCKAMIDE (registered trademark) 17-202, TD-961, TD-977, TD-992, WN-155, WN-170, WN-405, WN-505, WN-620, F4, WH-650, EA-330, EA-2020, TD-960, and TD-982 manufactured by DIC Corporation, and EPOMIN (registered trademark) SP-003, SP-006, SP-012, SP-018, SP-200, and P-1000 manufactured by NIPPON SHOKUBAI CO., LTD.

In the cured-film formation composition of the present embodiment, the mixture mass ratio of the component (A) and the component (B) is preferably 5:95 to 95:5. In the case where the mass ratio of the component (A) is smaller than 5:95, the alignment properties may decrease. In the case where the mass ratio of the component (A) is larger than 95:5, the adhesion with a base film may deteriorate.

Furthermore, in the cured-film formation composition of the present embodiment, the polymer of the component (B) may be a mixture of a plurality of polymer types of the component (B). Another polymer different from the component (A) or (B) can be mixed unless the properties are affected.

<Component (C)>

The component (C) contained in the cured-film formation composition of the present embodiment is a cross-linking agent.

In the cured-film formation composition of the present embodiment, the component (C) is a compound that is preferably more hydrophilic than the acrylic polymer having photo-alignment properties of the component (A). Such a configuration allows the component (C) to be suitably dispersed in a film when a cured film is formed using the cured-film formation composition of the present embodiment.

Examples of the cross-linking agent being the component (C) include compounds such as an epoxy compound, a methylol compound, and an isocyanate compound, and the methylol compound is preferred.

Specific examples of the methylol compound include compounds such as alkoxymethylated glycoluril, alkoxymethylated benzoguanamine, and alkoxymethylated melamine.

Specific examples of the alkoxymethylated glycoluril include 1,3,4,6-tetrakis(methoxymethyl)glycoluril, 1,3,4,6-tetrakis(butoxymethyl)glycoluril, 1,3,4,6-tetrakis(hydroxymethyl)glycoluril, 1,3-bis(hydroxymethyl)urea, 1,1,3,3-tetrakis(butoxymethyl)urea, 1,1,3,3-tetrakis(methoxymethyl)urea, 1,3-bis(hydroxymethyl)-4,5-dihydroxy-2-imidazolinone, and 1,3-bis(methoxymethyl)-4,5-dimethoxy-2-imidazolinone.

Examples of the commercially available product thereof include: compounds such as glycoluril compounds (trade name: Cymel (registered trademark) 1170, Powderlink (registered trademark) 1174), a methylated urea resin (trade name: UFR (registered trademark) 65), and butylated urea resins (trade name: UFR (registered trademark) 300, U-VAN10S60, U-VANIOR, U-VAN11HV), manufactured by Nihon Cytec Industries Inc. (former Mitsui Cytec Ltd.); and urea/formaldehyde-based resins (highly condensed-type, trade name: Beckamine (registered trademark) J-300S, P-955, N) manufactured by DIC Corporation (former Dainippon Ink & Chemicals Inc).

Specific examples of the alkoxymethylated benzoguanamine include tetramethoxymethyl benzoguanamine. Examples of commercially available products thereof include a product (trade name: Cymel (registered trademark) 1123) manufactured by Nihon Cytec Industries Inc. (former Mitsui Cytec Ltd.) and products (trade name: NIKALAC (registered trademark) BX-4000, BX-37, BL-60, BX-55H) manufactured by Sanwa Chemical Co., Ltd.

Specific examples of the alkoxymethylated melamine include hexamethoxymethyl melamine. Examples of commercially available products thereof include methoxymethyl-type melamine compounds (trade name: Cymel (registered trademark) 300, 301, 303, 350) and butoxymethyl-type melamine compounds (trade name: Mycoat (registered trademark) 506, 508) manufactured by Nihon Cytec Industries Inc. (former Mitsui Cytec Ltd.), and methoxymethyl-type melamine compounds (trade name: NIKALAC (registered trademark) MW-30, MW-22, MW-11, MS-001, MX-002, MX-730, MX-750, MX-035) and butoxymethyl-type melamine compounds (trade name: NIKALAC (registered trademark) MX-45, MX-410, MX-302) manufactured by Sanwa Chemical Co., Ltd.

The component (C) may also be a compound obtained by condensing such a melamine compound, a urea compound, a glycoluril compound, or a benzoguanamine compound in which a hydrogen atom of an amino group is substituted with a methylol group or an alkoxymethyl group. Examples thereof include a high-molecular-weight compound produced from a melamine compound or a benzoguanamine compound described in U.S. Pat. No. 6,323,310. Examples of commercially available products of the melamine compound include trade name: Cymel (registered trademark) 303 (manufactured by Nihon Cytec Industries Inc. (former Mitsui Cytec Ltd.), and examples of commercially available products of the benzoguanamine compound include trade name: Cymel (registered trademark) 1123 (manufactured by Nihon Cytec Industries Inc. (former Mitsui Cytec Ltd.)).

Furthermore, as the component (C), it is also possible to use a polymer produced by using an acrylamide compound or a methacrylamide compound that is substituted with a hydroxymethyl group or an alkoxymethyl group, such as N-hydroxymethylacrylamide, N-methoxymethylmethacrylamide, N-ethoxymethylacrylamide, and N-butoxymethylmethacrylamide.

Examples of the polymer include a poly(N-butoxymethylacrylamide), a copolymer of N-butoxymethylacrylamide and styrene, a copolymer of N-hydroxymethylmethacrylamide and methyl methacrylate, a copolymer of N-ethoxymethylmethacrylamide and benzyl methacrylate, and a copolymer of N-butoxymethylacrylamide, benzyl methacrylate, and 2-hydroxypropyl methacrylate. The weight-average molecular weight of the polymer is 1,000 to 500,000, preferably 2,000 to 200,000, more preferably 3,000 to 150,000, and still more preferably 3,000 to 50,000. The weight-average molecular weight herein is a value obtained by gel permeation chromatography (GPC) using polystyrene as the standard sample.

These cross-linking agents may be used singly or in combination of two or more types.

The content of the cross-linking agent of the component (C) in the cured-film formation composition of the present embodiment is preferably 10 to 100 parts by mass, more preferably 15 to 80 parts by mass, based on 100 parts by mass of the total amount of the acrylic polymer of the component (A) and the polymer of the component (B). When the content of the cross-linking agent is excessively low, the solvent resistance and heat resistance of the cured film obtained from the cured-film formation composition decrease, and the sensitivity thereof during photo-alignment decreases. In contrast, when the content is excessively high, the photo-alignment properties and the preservation stability may deteriorate.

<Component (D)>

The cured-film formation composition of the present embodiment can further contain a cross-linking catalyst as a component (D) in addition to the component (A), the component (B), and the component (C).

As the cross-linking catalyst being the component (D), for example, an acid or thermal acid generator is available. This component (D) is effective in promoting heat-curing reaction of the cured-film formation composition of the present embodiment.

The component (D) is not limited as long as the component (D) is a sulfonic acid group-containing compound, hydrochloric acid or a salt thereof, or a compound that thermally decomposes to generate an acid during prebaking or postbaking, that is, a compound that thermally decomposes to generate an acid at a temperature of 80° C. to 250° C. Examples of such a compound include hydrochloric acid; and sulfonic acid such as methanesulfonic acid, ethanesulfonic acid, propanesulfonic acid, butanesulfonic acid, pentanesulfonic acid, octanesulfonic acid, benzenesulfonic acid, p-toluenesulfonic acid, camphorsulfonic acid, trifluoromethanesulfonic acid, p-phenolsulfonic acid, 2-naphthalenesulfonic acid, mesitylenesulfonic acid, p-xylene-2-sulfonic acid, m-xylene-2-sulfonic acid, 4-ethylbenzenesulfonic acid, 1H,1H,2H,2H-perfluorooctanesulfonic acid, perfluoro(2-ethoxyethane)sulfonic acid, pentafluoroethanesulfonic acid, nonafluorobutane-1-sulfonic acid, and dodecylbenzenesulfonic acid, and a hydrate or a salt thereof. Examples of the compound generating an acid by heat include bis(tosyloxy)ethane, bis(tosyloxy)propane, bis(tosyloxy)butane, p-nitrobenzyl tosylate, o-nitrobenzyl tosylate, 1,2,3-phenylene tris(methylsulfonate), p-toluenesulfonic acid pyridinium salt, p-toluenesulfonic acid morphonium salt, p-toluenesulfonic acid ethyl ester, p-toluenesulfonic acid propyl ester, p-toluenesulfonic acid butyl ester, p-toluenesulfonic acid isobutyl ester, p-toluenesulfonic acid methyl ester, p-toluenesulfonic acid phenethyl ester, cyanomethyl p-toluenesulfonate, 2,2,2-trifluoroethyl p-toluenesulfonate, 2-hydroxybutyl p-toluenesulfonate, N-ethyl-p-toluenesulfonamide,

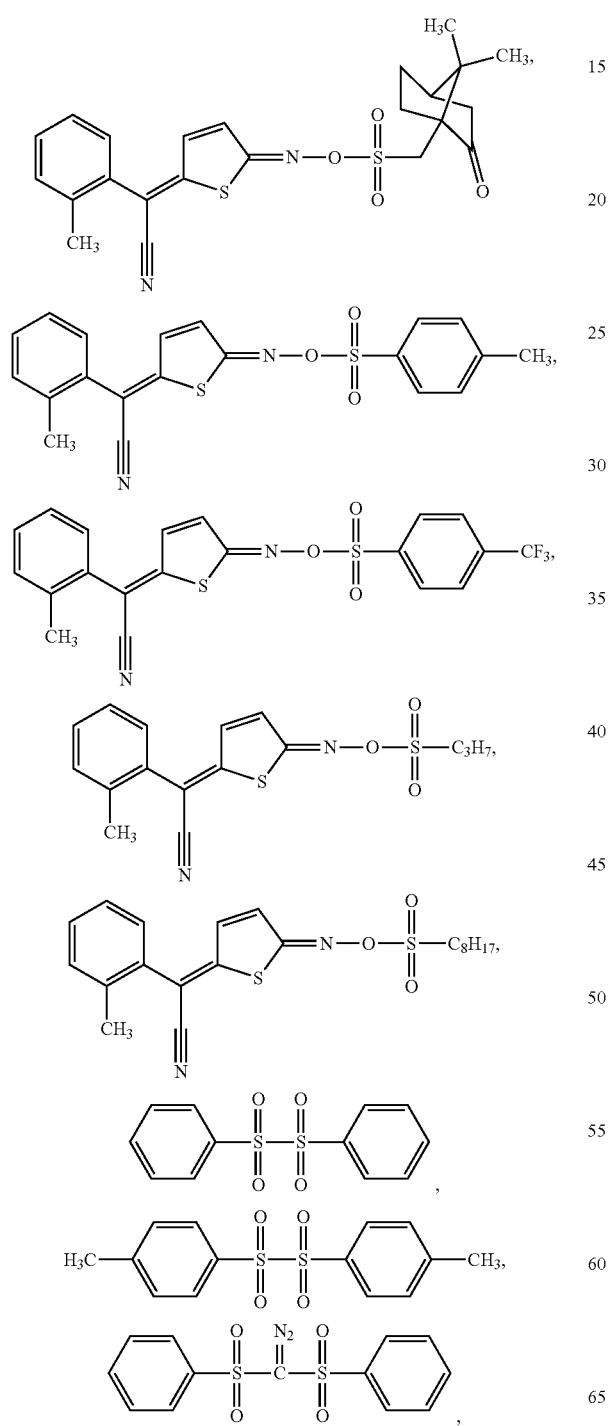

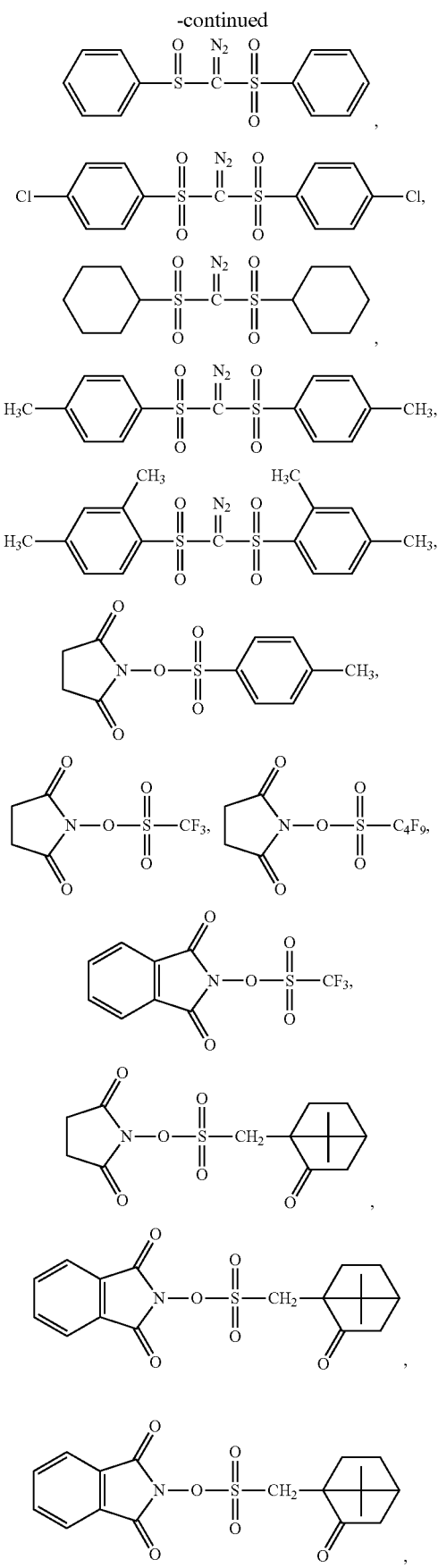

-continued
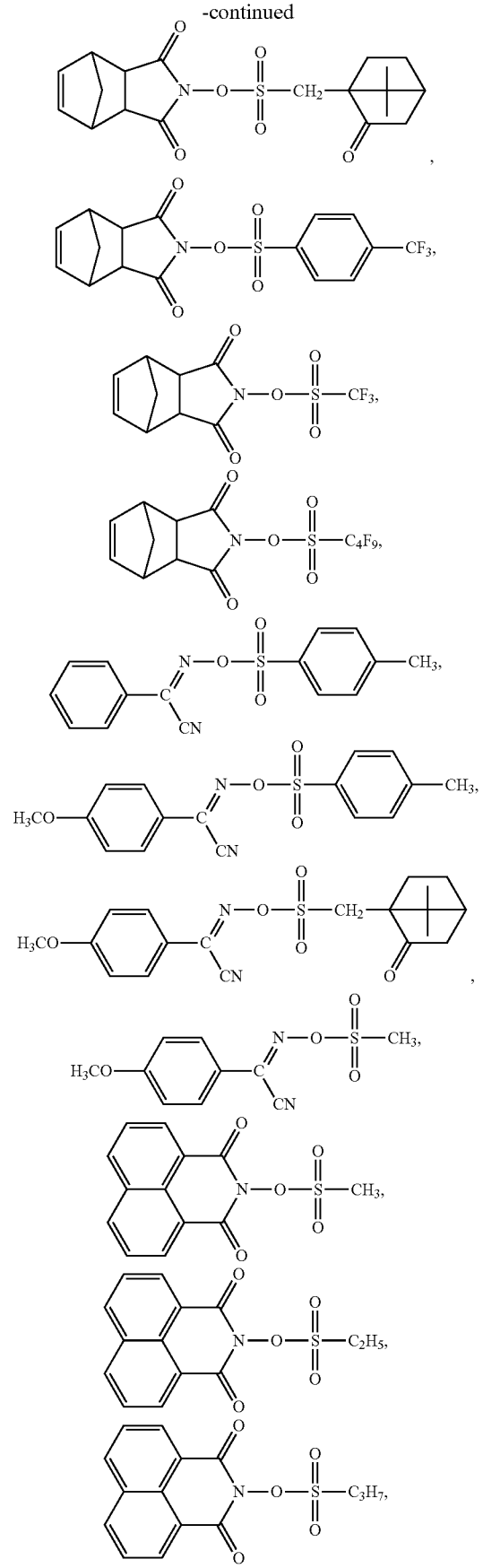
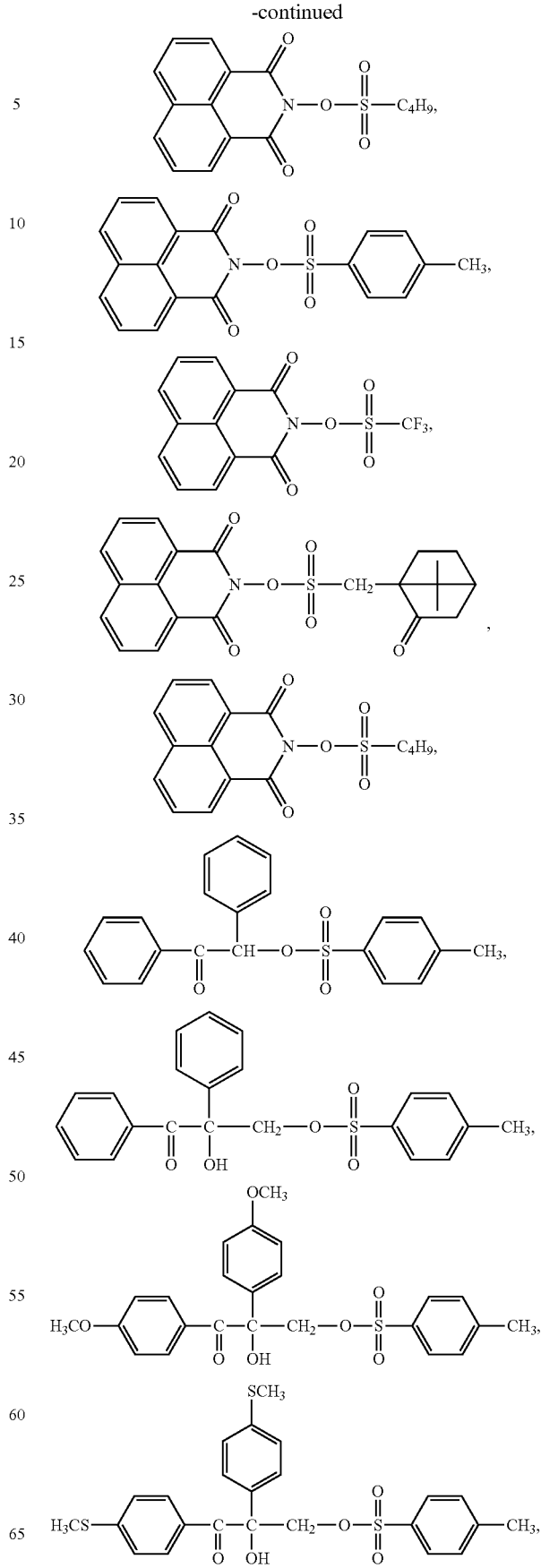

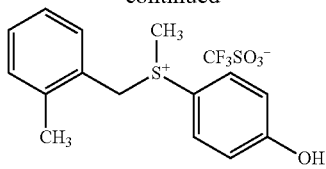

The content of the component (D) in the cured-film formation composition of the present embodiment is preferably 0.01 to 20 parts by mass, more preferably 0.1 to 15 parts by mass, and still more preferably 0.5 to 10 parts by mass with respect to 100 parts by mass of the total amount of the acrylic polymer of the component (A) and the polymer of the component (B). With the component (D) in a content of 0.01 part by mass or more, satisfactory thermosetting properties and satisfactory solvent resistance can be imparted to the composition and furthermore, high sensitivity to light irradiation can also be imparted to the composition. However, when the content exceeds 20 parts by mass, the preservation stability of the composition may deteriorate.

<Solvent>

The cured-film formation composition of the present embodiment is mainly used in a solution state in which the composition is dissolved in a solvent. The type, the structure, and the like of the solvent used herein are not limited as long as the solvent can dissolve the component (A), the component (B), and the component (C) and if necessary, the component (D) and/or other additives described below.

Specific examples of the solvent include methanol, ethanol, n-propanol, isopropanol, n-butanol, isobutanol, n-pentanol, 2-methyl-1-butanol, ethylene glycol monomethyl ether, ethylene glycol monoethyl ether, methylcellosolve acetate, ethylcellosolve acetate, diethylene glycol, diethylene glycol monomethyl ether, diethylene glycol monoethyl ether, propylene glycol, propylene glycol monomethyl ether, propylene glycol monomethyl ether acetate, propylene glycol monoethyl ether, propylene glycol propyl ether, propylene glycol propyl ether acetate, toluene, xylene, methyl ethyl ketone, methyl isobutyl ketone, cyclopentanone, cyclohexanone, 2-butanone, 3-methyl-2-pentanone, 2-pentanone, 2-heptanone, γ-butyrolactone, ethyl 2-hydroxypropionate, ethyl 2-hydroxy-2-methylpropionate, ethyl ethoxyacetate, ethyl hydroxyacetate, methyl 2-hydroxy-3-methylbutanoate, methyl 3-methoxypropinoate, ethyl 3-methoxypropionate, ethyl 3-ethoxypropionate, methyl 3-ethoxypropionate, methyl pyruvate, ethyl pyruvate, ethyl acetate, butyl acetate, ethyl lactate, butyl lactate, cyclopentyl methyl ether, N,N-dimethylformamide, N,N-dimethylacetamide, and N-methyl-2-pyrrolidone.

When a cured film is formed with the cured-film formation composition of the present embodiment on a triacetyl-cellulose (TAC) film to produce an orientation material, methanol, ethanol, isopropanol, n-propanol, butanol, 2-methyl-1-butanol, 2-heptanone, methyl isobutyl ketone, propylene glycol monomethyl ether, propylene glycol, diethylene glycol, propylene glycol monomethyl ether acetate, and the like are preferred because the TAC film exhibits resistance against these solvents.

These solvents may be used singly or in combination of two or more types.

Among these solvents, ethyl acetate was found to have an effect of enhancing the adhesiveness of the cured film formed. Accordingly, using ethyl acetate as a solvent or containing ethyl acetate in a solvent can enhance the adhesion of the cured film. Thus, ethyl acetate can be used as a solvent, and can also be used as the adhesion enhancing component.

When ethyl acetate is contained as a component of the cured-film formation composition of the present invention, a cured film formed of the cured-film formation composition of the present embodiment has enhanced adhesion to a substrate. Even on a substrate made of a resin such as a TAC film, a cured film having higher reliability can be formed, whereby a reliable orientation material can be provided.

<Other Additives>

Furthermore, the cured-film formation composition of the present embodiment can contain, as long as not impairing the effects of the present invention and if necessary, a sensitizer, an adhesion enhancer, a silane coupling agent, a surfactant, a rheology adjusting agent, a pigment, a dye, a preservation stabilizer, an antifoamer, and an antioxidant, for example.

For example, the sensitizer is effective in promoting photoreaction after a heat-cured film is formed with the cured-film formation composition of the present embodiment.

Examples of the sensitizer being one example of other additives include benzophenone, anthracene, anthraquinone, thioxanthone, derivatives thereof, and a nitrophenyl compound. Among them, a benzophenone derivative and a nitrophenyl compound are preferred. Specific examples of the preferred compound include N,N-diethylaminobenzophenone, 2-nitrofluorene, 2-nitrofluorenone, 5-nitroacenaphthene, 4-nitrobiphenyl, 4-nitrocinnamic acid, 4-nitrostilbene, 4-nitrobenzophenone, and 5-nitroindole. In particular, N,N-diethylaminobenzophenone that is a derivative of benzophenone is preferred.

These sensitizers are not limited to those described above. The sensitizer may be used singly or in combination of two or more types of compounds.

The proportion of the sensitizer used in the cured-film formation composition of the present embodiment is preferably 0.1 to 20 parts by mass, and more preferably 0.2 to 10 parts by mass with respect to 100 parts by mass of the total mass of the acrylic polymer having a photo-aligning group (specific copolymer) of the component (A) and a polymer having a substituent selected from a hydroxy group, a carboxy group, and an amino group on at least two terminals of a group bonded to a main chain of the component (B). When this proportion is excessively low, the effect as a sensitizer may not be sufficiently obtained, and when the proportion is excessively high, a decrease in the transmittance and roughening of the coating may occur.

<Preparation of Cured-Film Formation Composition>

The cured-film formation composition of the present embodiment contains an acrylic polymer having a photo-aligning group (specific polymer) being the component (A), a polymer having any one of a hydroxy group, a carboxy group, and an amino group on at least two terminals of a group bonded to a main chain being the component (B), and a cross-linking agent being the component (C). The cured-film formation composition of the present embodiment can further contain a cross-linking catalyst as the component (D) in addition to the component (A), the component (B), and the component (C). Unless the effects of the present invention are impaired, the cured-film formation composition may contain other additives.

Preferred examples of the cured-film formation composition of the present embodiment are listed below.

[1]: A cured-film formation composition in which the blending ratio of the component (A) to the component (B) is 5:95 to 95:5 in a mass ratio and that contains the component (C) at a content of 10 to 100 parts by mass based on 100 parts by mass of the total amount of the component (A) and the component (B).

[2]: A cured-film formation composition that contains the component (C) at a content of 10 to 100 parts by mass based on 100 parts by mass of the total amount of the component (A) and the component (B), and a solvent,

[3]: A cured-film formation composition that contains the component (C) at a content of 10 to 100 parts by mass and the component (D) at a content of 0.01 to 20 parts by mass based on 100 parts by mass of the total amount of the component (A) and the component (B), and a solvent.

The blending proportion, a preparation method, and the like, when the cured-film formation composition of the present embodiment is used as a solution will be described below in detail.

The proportion of solid content in the cured-film formation composition of the present embodiment is, but not limited to as long as each component is uniformly dissolved in a solvent, 1 to 80% by mass, preferably 3 to 60% by mass, and more preferably 5 to 40% by mass. The solid content herein is a component remaining after excluding the solvent from the whole component of the cured-film formation composition.

The preparation method of the cured-film formation composition of the present embodiment is not limited to a particular method. Examples of the preparation method include a method in which the component (B), the component (C), and further the component (D), and the like, are mixed in a solution of the component (A) dissolved in a solvent at predetermined proportions to make the resulting solution uniform, and a method in which in a certain step of this preparation method, other additives are further added therein if necessary, and the resulting solution is mixed.

In the preparation of the cured-film formation composition of the present embodiment, a solution of the specific copolymer obtained by polymerization reaction in the solvent can be used without being processed. In this case, for example, the component (B), the component (C), the component (D), and the like, are mixed to the solution of the component (A) in the same manner described above, and the resulting solution is made uniform. At this time, a solvent may be further added thereto for the purpose of adjusting the concentration. In this case, the solvent used in the process of preparing the component (A) may be the same as or different from the solvent used for adjusting the concentration of the cured-film formation composition.

It is preferable that the solution of the cured-film formation composition thus prepared be used after being filtered with a filter having a pore diameter of about 0.2 μm.

<Cured Film, Orientation Material, and Retardation Material>

A cured film can be formed as follows: the solution of the cured-film formation composition of the present embodiment is applied onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate) or a film (for example, a resin film such as a triacetylcellulose (TAC) film, a cycloolefin polymer film, a polyethylene terephthalate film, and an acrylic film), and the like, by bar coating, rotation coating, flow coating, roll coating, slit coating, slit coating followed by rotation coating, inkjet coating, printing, or the like, to form a coating; and then the resultant coating is heated and dried on a hot plate or in an oven.

As a condition for the heating and drying, it is preferable that cross-linking reaction caused by the cross-linking agent proceed in such a manner that a component included in an orientation material formed of the cured film is not eluted into a polymerizable liquid crystal solution applied onto the orientation material. For example, a heating temperature and a heating time that are appropriately selected from a temperature range of 60° C. to 200° C. and a time range of 0.4 minute to 60 minutes are used. The heating temperature and the heating time are preferably 70° C. to 160° C. and 0.5 minute to 10 minutes.

The film thickness of the cured film formed with the curable composition of the present embodiment is 0.05 μm to 5 μm, for example, which can be appropriately selected in consideration of level differences and the optical and electrical properties of a substrate used.

When irradiated with polarized UV light, the cured film thus formed can function as an orientation material, that is, a member on which a compound having liquid crystallinity, such as liquid crystals is aligned.

As a method for irradiation with polarized UV light, ultraviolet light to visible light having a wavelength of 150 nm to 450 nm are generally used, and the irradiation is performed by using linear polarized light in a vertical direction or an oblique direction at room temperature or in a heated state.

The orientation material formed of the cured-film composition of the present embodiment has solvent resistance and heat resistance. Hence, after a retardation substance described later is applied onto the orientation material, the retardation substance is heated up to the phase transition temperature of the liquid crystal. Thus, the retardation substance is transformed into a liquid crystal state to be aligned on the orientation material. The retardation substance thus aligned is cured without being processed, whereby the retardation material as a layer having optical anisotropy can be formed.

As the retardation substance, for example, a liquid crystal monomer having a polymerizable group and a composition containing the liquid crystal monomer (i.e., polymerizable liquid crystal solution) are used. When the substrate forming the orientation material is a film, the film having the retardation material of the present embodiment is useful as a retardation film. Some of such retardation substances for forming retardation materials transformed into a liquid crystal state are aligned on the orientation material in a state of horizontal alignment, cholesteric alignment, vertical alignment, hybrid alignment, or the like, and thus can be used differently depending on retardation required.

When a patterned retardation material used for a 3D display is produced, a cured film that is formed of the cured-film composition of the present embodiment by the above-described method is irradiated with polarized UV light in a direction of +45 degrees, for example, from a predetermined reference through a line-and-space pattern mask, and the cured film is then irradiated with polarized UV light in a direction of −45 degrees after removing the mask. Thus, an orientation material is obtained in which two types of liquid crystal alignment regions are formed and the directions of alignment control of liquid crystals in the regions are different. Subsequently, the retardation substance including a polymerizable liquid crystal solution is applied onto the orientation material, and is then heated up to the phase transition temperature of the liquid crystal. Thus, the retardation substance is transformed into a liquid crystal state to be aligned on the orientation material. The retardation substance thus aligned is cured without being processed, whereby a patterned retardation material can be obtained in which two types of retardation regions having different retardation characteristics are regularly aligned each in plurality.

A liquid crystal display element in which a liquid crystal is aligned can be prepared by sticking together two substrates having orientation materials of the present embodiment with a spacer interposed therebetween so that the orientation materials on the respective substrates face each other, and then injecting a liquid crystal between the substrates.

Thus, the cured-film formation composition of the present embodiment can be suitably used for producing, for example, various retardation materials (retardation films) or liquid crystal display elements.

EXAMPLES

The present embodiment will be described in further detail with reference to examples below, but is not limited to the examples. A measurement method with a measurement condition for each of the physical properties in the examples is described below.

—NMR

Target compounds were dissolved in deuterated chloroform ($CDCl_3$) and the $^1$H-NMR of each target compound was determined with a nuclear magnetic resonance apparatus (300 MHz, manufactured by JEOL RESONANCE Inc.).

[Abbreviations Used in Examples]

The following are the meanings of the abbreviations used in Examples below.

<Component (A): Acrylic Polymer Having Photo-Aligning Group (Specific Copolymer), Raw Material>
CIN1: 4-(6-methacryloxyhexyl-1-oxy)cinnamic acid methyl ester
CIN2: 4-[6-(2-methacryloyloxyethyl aminocarbonyloxy)hexyloxy]cinnamic acid methyl ester
CIN3: 4-(6-hydroxyhexyloxy) cinnamic acid methyl ester
HEMA: 2-hydroxyethyl methacrylate
AIBN: α,α'-azobisisobutyronitrile
<Component (B): Polymer, Raw Material>
PCT: polycaprolactone triol (number average molecular weight 2,000)
PEPO: polyester polyol (adipic acid/diethylene glycol copolymer) (number average molecular weight 4,800)
<Component (C): Cross-Linking Agent>
HMM: hexamethoxymethylmelamine <Component (D): Cross-Linking Catalyst>
PTSA: p-toluenesulfonic acid monohydrate
<Solvent>
PM: propylene glycol monomethyl ether
PMA: propylene glycol monomethyl ether acetate The number-average molecular weight and the weight-average molecular weight of the acrylic polymer obtained according to Synthesis Examples below were measured with a GPC apparatus manufactured by JASCO Corporation (Shodex (registered trademark) column KF 803L and KF 804L) under the condition of performing elution by flowing an elution solvent tetrahydrofuran in the column (column temperature: 40° C.) at a flow rate of 1 mL/min. The number-average molecular weight (hereinafter, called Mn) and the weight-average molecular weight (hereinafter, called Mw) were expressed as values in terms of polystyrene.

Reference Example 1

Synthesizing 4-[6-(2-Methacryloyloxyethyl aminocarbonyloxy)hexyloxy]cinnamic acid methyl ester (CIN2)

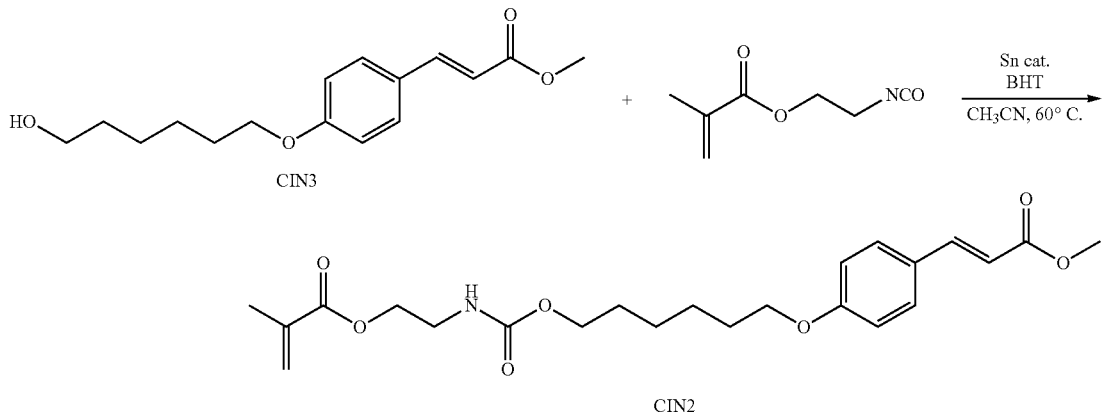

CIN3 (511.6 g), dibutyl tin laurate (0.1401 g), and 2,6-di-tert-butyl-p-cresol (BHT) (2.831 g) were dissolved in acetonitrile (2364 g), then the resultant solution was heated to 50° C., and then 2-methacryloyloxyethyl isocyanate (299.79 g) (containing BHT) was added dropwise into the resultant solution over 40 minutes. After the dropwise addition, the reaction was continued at 60° C. for two hours until the peak of CIN3 disappeared while the reaction was monitored with a HPLC. After the reaction, the resultant solution was cooled to 5° C., and the precipitated solid was filtered. The residue was washed twice with acetonitrile (790.0 g). The residue thus obtained was dried under vacuum at 35° C. to obtain 630.0 g of CIN2 (HPLC area percent (310 nm): 99.53%). The obtained crystal was determined as CIN2 according to the result of $^1$H-NMR analysis.

$^1$H-NMR (CDCl3, δ ppm): 7.65 (d, 1H), 7.46 (d, 2H), 6.88 (d, 2H), 6.31 (d, 1H), 6.12 (s, 1H), 5.60 (s, 1H), 4.92 (brs, 1H), 4.23 (t, 2H), 4.08 (t, 2H), 3.98 (t, 2H), 3.79 (s, 3H), 3.52-3.49 (m, 2H), 1.95 (s, 3H), 1.83-1.77 (m, 2H), 1.68-1.62 (m, 2H), 1.54-1.42 (m, 4H) Melting Point: 76.4° C.

Synthesis Example 1

40.0 g of CIN1, 10.0 g of HEMA, and 1.2 g of AIBN as a polymerization catalyst were dissolved in 133.5 g of PMA, and the resultant solution was caused to react at 85° C. for 20 hours to obtain a specific copolymer solution (solid content concentration: 27% by mass) (P1). Mn and Mw of the obtained specific copolymer were 7,080 and 14,030, respectively.

Synthesis Example 2

40.0 g of CIN2, 10.0 g of HEMA, and 1.2 g of AIBN as a polymerization catalyst were dissolved in 204.8 g of PM, and the resultant solution was caused to react at 85° C. for 20 hours to obtain a specific copolymer solution (solid content concentration: 20% by mass) (P2). Mn and Mw of the obtained specific copolymer were 6,500 and 12,000, respectively.

Synthesis Example 3

50.0 g of HEMA and 1.2 g of AIBN as a polymerization catalyst were dissolved in 204.8 g of PM, and the resultant solution was caused to react at 85° C. for 20 hours to obtain a copolymer solution (solid content concentration: 20% by mass) (P3). Mn and Mw of the obtained copolymer were 8,500 and 15,000, respectively.

Example 1 to Example 4

Each of cured-film formation compositions of Example 1 to Example 4 was prepared according to the formulations given in Table 1, and the adhesion, the adhesion durability, the alignment sensitivity, and the pattern formability of each thereof were evaluated.

TABLE 1

|  | (A) Component* (g) | (B) Component (g) | (C) Component (g) | (D) Component (g) | Solvent (g) |
|---|---|---|---|---|---|
| Example 1 | P1 3.7 | PEPO 0.8 | HMM 1 | PTSA 0.1 | PM 42.7 |
| Example 2 | P2 5 | PEPO 0.8 | HMM 1 | PTSA 0.1 | PM 41.4 |
| Example 3 | P2 5 | PEPO 1.5 | HMM 1 | PTSA 0.1 | PM 52.4 |
| Example 4 | P2 5 | PCT 0.8 | HMM 1 | PTSA 0.1 | PM 41.4 |

*P1 and P2 are additive amounts of the component as a specific copolymer solution.

Comparative Examples 1 and 2

Each of cured-film formation compositions of Comparative Examples 1 and 2 was prepared according to the formulation given in Table 2, and the adhesion, the adhesion durability, the alignment sensitivity, and the pattern formability of each thereof were evaluated.

TABLE 2

|  | (A) Component* (g) | (B) Component* (g) | (C) Component (g) | (D) Component (g) | Solvent (g) |
|---|---|---|---|---|---|
| Comparative Example 1 | P2 5 | P3 6.5 | HMM 1.7 | PTSA 0.1 | PM 38.3 |
| Comparative Example 2 | CIN 3 1.3 | PEPO 1.3 | HMM 1.7 | PTSA 0.1 | PM 47.2 |

*P2 and P3 are additive amounts of the components as specific copolymer solutions or copolymer solutions.

[Evaluation of Adhesion]

A TAC film was spin coated with each of the cured-film formation compositions of Examples and Comparative Examples by a spin coater at 2000 rpm for 30 seconds, and then the resultant film was heated and dried at 110° C. for 120 seconds in a heat circulation oven to form a cured film. This cured film was vertically irradiated with linear polarized light of 313 nm at 20 mJ/cm$^2$.

The cured film thus irradiated was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating having a film thickness of 1.0 μm. The coating on the film was exposed at 1000 mJ/cm$^2$ to prepare a retardation material, A cross cut (1 mm×1 mm×100 squares) was made with a utility knife into the retardation material on the film obtained, and a piece of Cellotape (registered trademark) manufactured by Nichiban Co., Ltd., was then stuck thereto. Subsequently, the Cellotape (registered trademark) was pulled off, and the number of squares of the films remaining on the substrate without being peeled was counted. Those having 90 or more squares of the films remaining without being peeled were determined to be excellent in adhesion.

[Evaluation of Alignment Sensitivity]

A TAC film was spin coated with each of the cured-film formation compositions of Examples and Comparative Examples by a spin coater at 2000 rpm for 30 seconds, and then the resultant film was heated and dried at 110° C. for 120 seconds in a heat circulation oven to form a cured film. This cured film was vertically irradiated with linear polarized light of 313 nm to form an orientation material.

The orientation material on the film was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating having a film thickness of 1.0 μM, The coating on the film was exposed at 1000 mJ/cm$^2$ to produce a retardation material.

The retardation material on the film produced was sandwiched between a pair of polarizing plates, and the emergence of retardation properties in the retardation material was observed. The exposure amount of polarized UV light that was necessary for the orientation material to exhibit liquid crystal alignment properties was determined to be the alignment sensitivity.

[Evaluation of Pattern Formability]

A TAC film was spin coated with each of the cured-film formation compositions of Examples and Comparative Examples by a spin coater at 2000 rpm for 30 seconds, and then the resultant film was heated and dried at 110° C. for 120 seconds in a heat circulation oven to form a cured film. This cured film was vertically irradiated with linear polarized light of 313 nm at 30 mJ/cm$^2$ through a line-and-space pattern mask of 100 μM, After the mask was removed, the substrate was rotated 90 degrees, and was then vertically irradiated with linear polarized light of 313 nm at 15 mJ/cm². Thus, an orientation material was obtained in which two types of liquid crystal alignment regions were formed and the directions of alignment control of liquid crystals in the regions were different by 90 degrees.

This orientation material on the film was coated with a polymerizable liquid crystal solution RMS03-013C for horizontal alignment manufactured by Merck Ltd., Japan by a spin coater, and then the resultant coating was prebaked on a hot plate at 60° C. for 60 seconds to form a coating having a film thickness of 1.0 µm. This coating on the film was exposed at 1000 mJ/cm² to produce a patterned retardation material.

The produced patterned retardation material on the film was observed with a polarizing microscope. Those on which a retardation pattern was formed without alignment failure were evaluated as "○", and those on which alignment failure was observed were evaluated as "x"

[Evaluation of Adhesion Durability]

A TAC film was spin coated with each of the cured-film formation compositions of Examples and Comparative Examples by a spin coater at 2000 rpm for 30 seconds, and then the resultant film was heated and dried at 110° C. for 120 seconds in a heat circulation oven to form a cured film. This cured film was vertically irradiated with linear polarized light of 313 nm at 20 mJ/cm².

The film thus exposed was coated with a polymerizable liquid crystal solution RMS03-013C for horizontal alignment manufactured by Merck Ltd., Japan by a spin coater, and then each of the resultant coating was prebaked on a hot plate at 60° C. for 60 seconds to form a coating having a film thickness of 1.0 µm. The film was exposed at 1000 mJ/cm² to produce a retardation material.

The film on which the retardation material was formed was stored for 100 hours under the condition where a temperature was 80° C. and a humidity was 90%. A cross cut (1 mm×1 mm×100 squares) was made with a utility knife into the retardation material on the film obtained, and a piece of Cellotape (registered trademark) was then stuck thereto. Subsequently, the Cellotape (registered trademark) was pulled off, and the number of squares of the films remaining on the substrate without being peeled was counted. Those having the same adhesion as the initial adhesion evaluated before conducting the 100-hour storage were evaluated to be excellent in durability.

[Evaluation Results]

Results of the above-described evaluations are given in Table 3 below.

TABLE 3

| | Adhesion | Alignment Sensitivity (mJ/cm²) | Pattern Formation | Adhesion Durability |
|---|---|---|---|---|
| Example 1 | 100/100 | 10 | ○ | 100/100 |
| Example 2 | 100/100 | 10 | ○ | 100/100 |
| Example 3 | 100/100 | 10 | ○ | 100/100 |
| Example 4 | 100/100 | 10 | ○ | 100/100 |
| Comparative Example 1 | 20/100 | 10 | ○ | 0/100 |
| Comparative Example 2 | 100/100 | 10 | ○ | 0/100 |

Examples 1 to 4 exhibited liquid crystal alignment properties with a small exposure amount to exhibit high alignment sensitivity, and optical patterning was able to be performed thereon. All of them also exhibited high adhesion durability.

Comparative Example 1 exhibited low adhesion and Comparative Example 2 exhibited low adhesion durability.

INDUSTRIAL APPLICABILITY

The cured-film formation composition according to the present invention is very useful as a liquid crystal alignment film for a liquid crystal display element or an orientation material for forming an optically anisotropic film that is provided inside or outside the liquid crystal display element, and is particularly suitable as a material for forming a patterned retardation material for a 3D display.

The invention claimed is:

1. A cured-film formation composition comprising:
    (A) an acrylic polymer having a photo-aligning group;
    (B) a polymer having a substituent selected from the group consisting of a hydroxy group, a carboxy group, and an amino group only on at least two ultimate terminals of a main chain,
    wherein
    the polymer is at least one polymer selected from the group consisting of a polyetherpolyol, a polyester polyol obtained by the reaction of a polyvalent carboxylic acid with a diol, a polycarbonate polyol, and a polycaprolactone polyol; and
    (C) a cross-linking agent.

2. The cured-film formation composition according to claim 1, wherein
    the photo-aligning group of the component (A) is a functional group having a structure to be photodimerized or photoisomerized.

3. The cured-film formation composition according to claim 1, wherein
    the photo-aligning group of the component (A) is a cinnamoyl group.

4. The cured-film formation composition according to claim 1, wherein
    the photo-aligning group of the component (A) is a group having an azobenzene structure.

5. The cured-film formation composition according to claim 1, wherein
    the component (A) is an acrylic polymer further having at least one substituent selected from the group consisting of a hydroxy group, a carboxy group, and an amino group.

6. The cured-film formation composition according to claim 1, wherein
    the cross-linking agent of the component (C) is more hydrophilic than the component (A).

7. The cured-film formation composition according to claim 1, wherein
    the cross-linking agent of the component (C) is a cross-linking agent having a methylol group or an alkoxymethyl group.

8. The cured-film formation composition according to claim 1, further comprising a cross-linking catalyst (D).

9. The cured-film formation composition according to claim 1, wherein
    a ratio of the component (A) to the component (B) is 5:95 to 95:5 in a mass ratio.

10. The cured-film formation composition according to claim 1, wherein
    10 parts by mass to 100 parts by mass of the component (C) is contained based on 100 parts by mass of the total amount of the component (A) and the component (B).

11. The cured-film formation composition according to claim 8, wherein 0.01 part by mass to 20 parts by mass of the component (D) is contained based on 100 parts by mass of the total amount of the component (A) and the component (B).

12. An orientation material, being obtained with the cured-film formation composition as claimed in claim 1.

13. A retardation material, being formed with a cured film that is obtained from the cured-film formation composition as claimed in claim 1.

14. The cured-film formation composition according to claim 1, wherein component (B) is a polycaprolactone triol.

15. The cured-film formation composition according to claim 1, wherein component (B) is a polyester polyol obtained by the reaction of a polyvalent carboxylic acid with a diol.

16. The cured-film formation composition according to claim 15, wherein the polyvalent carboxylic acid is adipic acid, sebacic acid, or isophthalic acid, and the diol is ethylene glycol, diethylene glycol, propylene glycol, butylene glycol, polyethylene glycol, or polypropylene glycol.

17. The cured-film formation composition according to claim 16, wherein the polyvalent carboxylic acid is adipic acid, and the diol is diethylene glycol.

18. The cured-film formation composition according to claim 1, component (B) is an adipic acid/diethylene glycol copolymer, and component (A) is a reaction product of 4-(6-methacryloxyhexyl-1-oxy)cinnamic acid methyl ester or 4-[6-(2-methacryloyloxyethyl aminocarbonyloxy)hexyloxy]cinnamic acid methyl ester, with 2-hydroxyethyl methacrylate.

* * * * *